United States Patent [19]

Woods et al.

[11] Patent Number: 5,428,799
[45] Date of Patent: Jun. 27, 1995

[54] REDIRECTION OF INTERRUPTS TO MICROPROCESSORS

[75] Inventors: Greg Woods, San Jose; Carol Bassett; Robert Campbell, both of Cupertino, all of Calif.

[73] Assignee: Hewlett-Packard Company, Palo Alto, Calif.

[21] Appl. No.: 250,349

[22] Filed: May 27, 1994

Related U.S. Application Data

[63] Continuation of Ser. No. 654,680, Feb. 13, 1991, abandoned.

[51] Int. Cl.$^6$ .............................................. G06F 9/46
[52] U.S. Cl. .............................. 395/725; 364/DIG. 1; 364/230; 364/230.2; 364/241.2; 364/242; 364/242.1
[58] Field of Search ............... 395/325, 425, 650, 725; 340/172.5

[56] References Cited

U.S. PATENT DOCUMENTS

| | | | |
|---|---|---|---|
| 3,665,404 | 5/1972 | Werner | 395/725 |
| 4,004,283 | 1/1977 | Bennet et al. | 340/172.5 |
| 4,291,371 | 9/1981 | Holtey | 395/725 |
| 4,631,670 | 12/1986 | Bradley et al. | 395/725 |
| 4,709,324 | 11/1987 | Kloker | 395/725 |
| 4,734,882 | 3/1988 | Romagosa | 395/725 |
| 4,768,149 | 8/1988 | Konopik et al. | 395/725 |
| 4,907,149 | 3/1990 | Gula et al. | 395/725 |
| 4,918,599 | 4/1990 | Hashimoto et al. | 395/725 |
| 4,967,342 | 10/1990 | Lent et al. | 395/725 |
| 5,125,093 | 6/1992 | McFarland | 395/725 |
| 5,175,853 | 12/1992 | Kardach et al. | 395/650 |

*Primary Examiner*—Allen R. MacDonald
*Assistant Examiner*—Tariq Hafiz

[57] ABSTRACT

A redirector in either software or hardware can is used to distribute global interrupts among all processors of a multiprocessor (MP) system, which may have multiple architecturally-isolated buses. When redirecting interrupts using software, a default processor receives all interrupts and redirects them to destination processors. When redirecting interrupts using hardware, a discrete redirector in hardware forwards all interrupts to particular processors based on a routing, or look-up, table. Another implementation incorporates interrupt snooping with either software or hardware interrupt redirection where interrupt response is critical for I/O cards.

14 Claims, 8 Drawing Sheets

REDIRECTION OF INTERRUPTS TO MICROPROCESSORS

CROSS REFERENCE TO RELATED APPLICATION

This is a continuation of application Ser. No. 07/654,680 filed on Feb. 13, 1991, now abandoned.

BACKGROUND OF THE INVENTION

1. Field of the Invention

The present invention relates to computer systems, and more particularly, to a computer architecture for providing efficient communication and control of interrupts directed to multiprocessors on multiple buses.

2. Related Art

As a consequence of the rapidly evolving personal computer (PC) industry, high end PCs have migrated into high performance applications which were traditionally handled by minicomputers or mainframe computers. These high performance applications require interaction with many peripherals at high speeds as well as manipulation of enormous amounts of data to provide real time operation as perceived by a user.

As a result, multiple processors have been implemented in PC architectures to maximize speed by allocation of tasks and responsibilities which can be performed in parallel. In other words, the independent processors of a multiprocessor (MP) system execute instructions simultaneously via a multithread instruction set to concurrently process transactions.

As more and more processors are added to an MP system, the communication and control of interrupts becomes more complex and burdensome on an MP system. Interrupts are signals which prompt a central processing unit (CPU) to automatically and immediately execute a necessary special routine within a computer system.

Upon receipt of an interrupt, a CPU will follow an interrupt sequence. During the interrupt sequence, the CPU first completes the instruction currently being executed. Next, it saves all register values (for example, an instruction pointer (IP), code segment (CS), processor status word (PSW), and others) needed to return to the next instruction in a stack within the main memory or a special purpose register located in the CPU or elswhere. The interrupt routine then takes place. After the interrupt has been executed, the CPU returns to the program that it was originally executing via an instruction at the end of the interrupt routine which inserts the register values from the stack or special purpose register back into the CPU.

In an MP system, interrupts often originate from several different locations and accordingly are given special names. Some interrupts are "internal" interrupts. Internal interrupts are initiated by the state of the CPU or by an instruction. For example, typical internal interrupts would be one caused by a division by zero.

Other interrupts are "external" interrupts. External interrupts are caused by a signal being sent to the CPU from elsewhere in the computer system. An example of an external interrupt would be one caused by the need of an input/output (I/O) device to be serviced by the CPU.

Moreover, external interrupts can sometimes be divided into two types in MP systems having a complex network of interrupts: (1) "local" interrupts and (2) "global" interrupts. Local interrupts would be an interrupt originating locally with respect to the destination CPU, or in other words, an interrupt generated in the same subsystem. An example of a local interrupt would be an interrupt from a math coprocessor. In contrast, global interrupts originate in a subsystem other than the destination CPU. Examples of global interrupts are those generated from a user keyboard, a system timer, a disk drive controller, a video controller, a serial or parallel port, or the like.

Efficient communication and control of interrupts is critical for high performance MP systems. Specifically, global interrupts must be readily managed among all processors of an MP system where the processors are spread across several different buses.

In the conventional art, global interrupts are commonly controlled by a "system" interrupt controller. The controller may take the form of a single unit or multiple units working in concert. A typical system interrupt controller that can operate independently or in combination, for example, is an INTEL 8259 programmable interrupt controller (PIC). The INTEL 8259 interrupt controller is commercially available and is manufactured by the Intel Corporation, California, U.S.A.

In a usual interrupt protocol, the system interrupt controller communicates all interrupts to an arbitrary "default" CPU. The default CPU puts identifiable segments of data, which include instructions, into the shared main memory to specify the interrupt, the destination CPU, and the interrupt routine to be implemented by the destination CPU. The other processors in the MP system continuously access the shared main memory so as to monitor for queues or identifiers of the segments of data. The destination CPU then recognizes the interrupt and acts in accordance with the specified interrupt routine.

However, the foregoing conventional technique of global interrupt management is problematic in high performance MP systems with multiple buses. The default CPU often must temporarily stop execution of its own program in order to execute code related to the channelling of interrupts to the shared main memory.

Furthermore, excessive traffic exists on the buses between all of the CPUs and the shared main memory. Because of the numerous transactions that must take place between the CPUs and the main memory, the speed of the MP system as a whole is slower than optimum. Further, as a result of the reduced performance, the number of processors which may be interfaced to the MP system is more limited.

Another method known to be in the conventional art is called "interrupt snooping." Interrupt snooping has been suggested for MP systems where CPUs are situated on I/O cards having exclusive buses, such as the conventional extended industry standard architecture (EISA) bus or the conventional microchannel (MCA) bus. The I/O cards are plugged into, for instance, a fast system bus of the computer system, thereby forming a multiple bus system.

Interrupt snooping does not utilize the concept of a default CPU or any central location for generating and channelling interrupts. Interrupts are generated and received at each I/O card.

To implement the process of interrupt snooping, the bus master of each I/O card is equipped with an INTEL 8259 interrupt controller or an equivalent circuit(s) thereof. Interrupts from the interrupt controllers are masked from the components of the computer system that are not intended to receive interrupts. All of the bus masters monitor the system bus for interrupts corresponding to each and then direct the interrupts to local CPUs on its respective I/O card. Essentially, the entire responsibility for global interrupts is transferred from the computer system to the I/O cards.

However, the preceding interrupt management scheme is not ideal for a high performance MP system having multiple buses. The scheme requires that interrupts be managed on a bus by bus basis and that each bus have at least one interrupt transmission and reception mechanism. More specifically, if CPUs are added to the system bus where the I/O cards are interfaced, the added CPUs must duplicate interrupt logic, either in hardware or software, in order to send and receive interrupts to CPUs on the I/O cards. Moreover, standard interrupts from, for example, the system timer and/or the user keyboard, cannot be interfaced to the system bus without the addition of interrupt circuitry.

SUMMARY OF THE INVENTION

The present invention is a system and method for providing high performance management of global interrupts in a multiprocessor (MP) system which has a shared memory and which can have multiple architecturally isolated buses.

The present invention envisions implementing a redirector which receives global interrupts from a system interrupt controller. The redirector may be either in the form of software in a default processor or a discrete component of hardware, such as a programmable logic array or arrays.

After receiving global interrupts, the redirector directly notifies individual processors in the MP system of the global interrupts. Some of the individual processors could exist on remote, architecturally-isolated buses, perhaps on input/output (I/O) cards.

It is further envisioned that the present invention may be implemented to operate in concert with the concept of interrupt snooping. Interrupt snooping is conventionally contemplated for some commercial I/O cards.

FEATURES AND ADVANTAGES OF THE INVENTION

The present invention overcomes the deficiencies of the prior art, as noted above, and further provides for the following additional features and advantages.

First, the present invention reduces the amount of traffic on the buses of a computer system by eliminating the unnecessary repetitive consulting of the main memory by the processors of the MP system. As a result, the speed of the MP system as a whole is enhanced, and the number of processors that may be interfaced to the MP system is increased.

Second, the present invention may be practiced without redefining the protocols and/or the compatibility models of the various buses of the MP system.

Third, the present invention is flexible in that it can be implemented in either software or hardware.

Fourth, the present invention allows for a versatile processor configuration. In other words, the present invention can be implemented with homogeneous or nonhomogeneous MPUs. For example, MPUs from the "INTEL" family of MPUs (manufactured by the Intel Corporation, U.S.A.) may be mixed with the "MOTOROLA" family of MPUs (manufactured by Motorola, Inc., U.S.A.).

Further features and advantages of the present invention will become apparent to one skilled in the art upon examination of the following drawings and detailed description. It is intended that any additional features and advantages be incorporated herein.

BRIEF DESCRIPTION OF THE DRAWINGS

The present invention as defined in the claims can be better understood with reference to the text and to the following drawings:

FIG. 5 illustrates flowcharts for implementing the method of the present invention;

FIGS. 6 in combination with FIG. 7 shows an example of a specific hardware implementation of the redirector of the present invention, wherein FIG. 6 illustrates a vector translation sender situated locally to the system interrupt controller and FIG. 7 illustrates a vector translation receiver situated locally to each of the n MPUs of the MP system.

DETAILED DESCRIPTION OF THE PREFERRED EMBODIMENT

Figure 1:
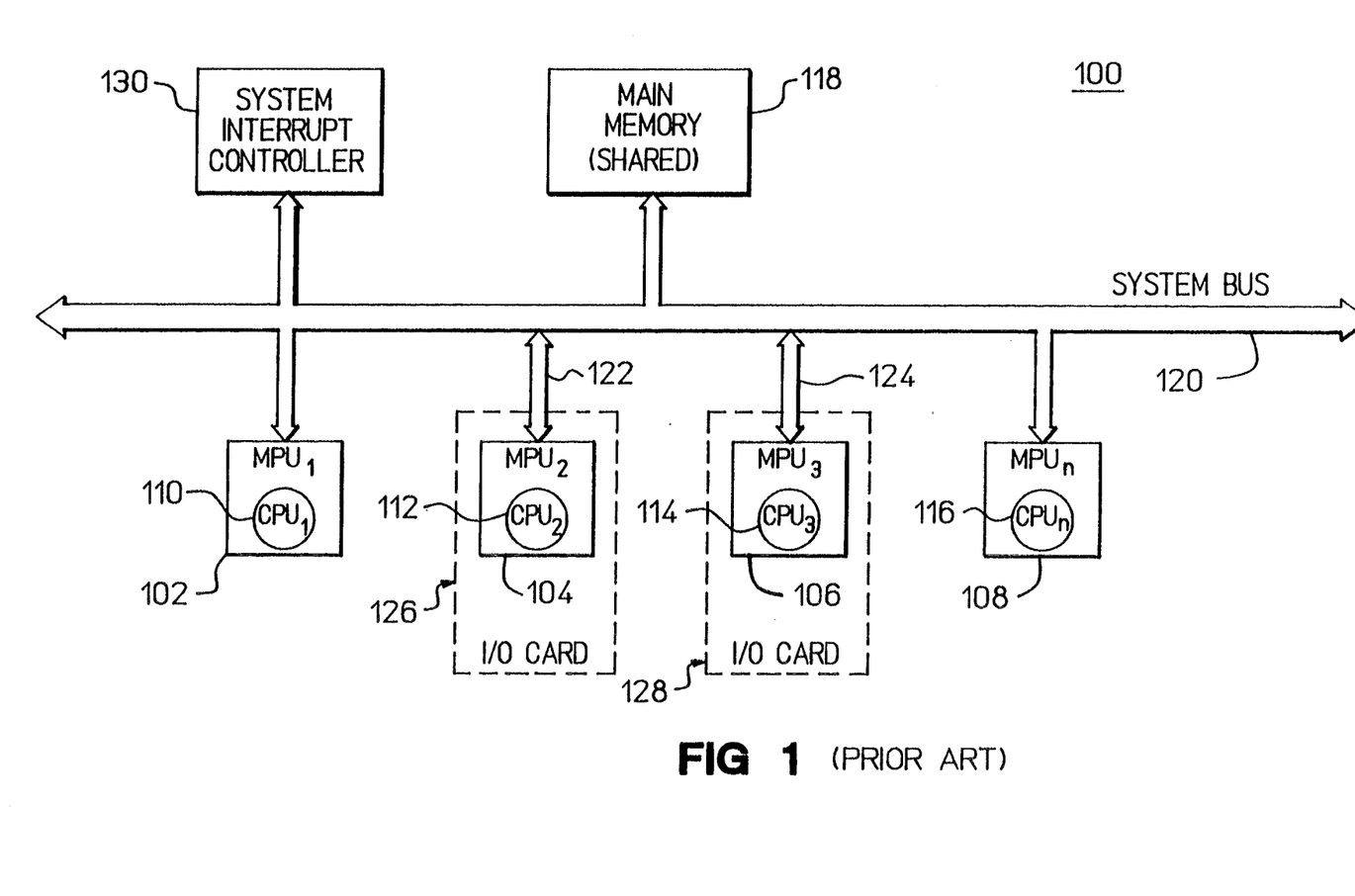
FIG. 1 is a block diagram of a conventional multiprocessor (MP) system having n multiprocessing units (MPU) that may be employed in a personal computer (PC) architecture.

FIG. 1 illustrates a conventional personal computer (PC) architecture having n microprocessing units (MPU) 102–108 with n respective central processing units (CPU) 110–116. The MPUs 102–108 share a main memory 118.

The MPUs 102–108 reside on several architecturally isolated buses. The MPU 102 and the MPU 108 reside on a system bus 120 along with the main memory 118, while the MPU 104 resides on a bus 122 and the MPU 106 resides on a bus 124. The bus interfaces are not shown for simplicity. Any of the n MPUs 102–108 could reside on conventional input/output (I/O) cards which are plugged into the system bus 120. As shown, the MPUs 104 and 106 as well as their respective buses 122 and 124 could reside on I/O cards 126 and 128.

In the MP system of FIG. 1, a system interrupt controller 130 provides for the global interrupts in the MP system. The system interrupt controller 130 is directly interfaced to the system bus 120.

Figure 2:
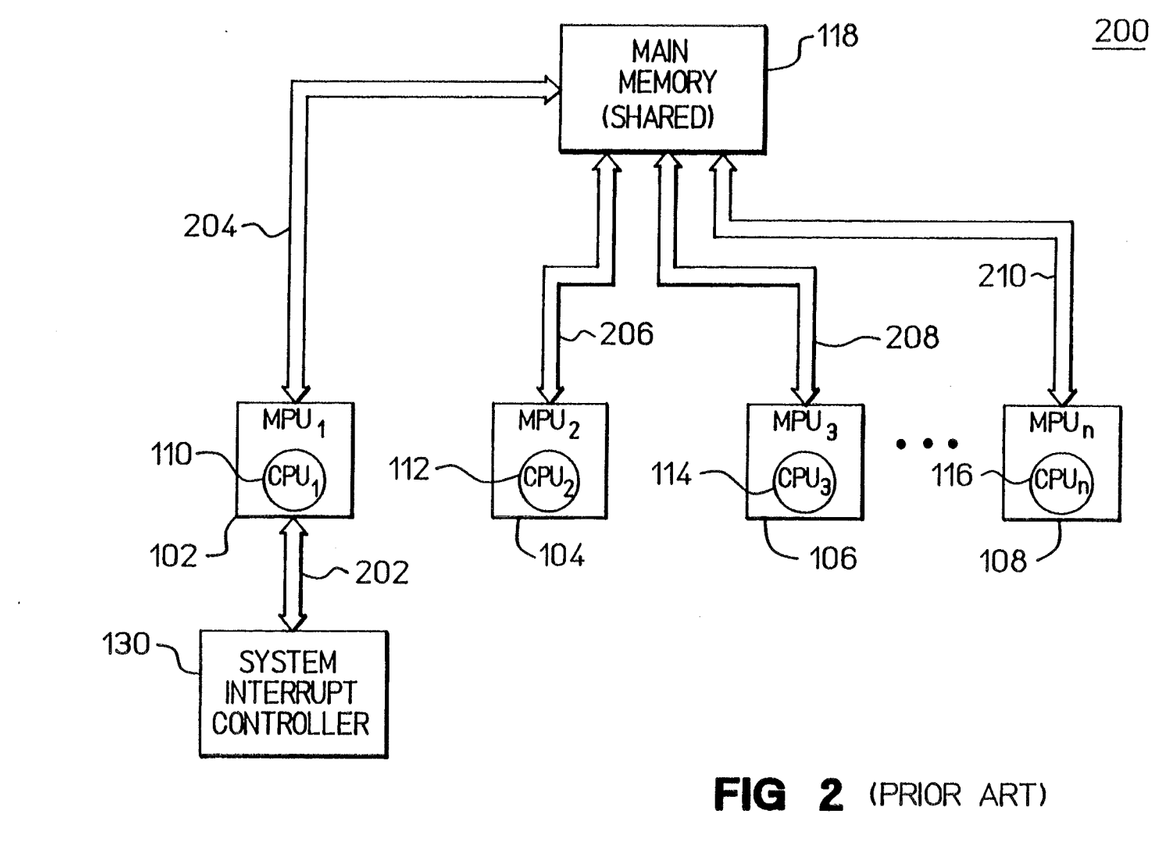
FIG. 2 illustrates a common interrupt protocol using the architecture of FIG. 1, where a system interrupt controller communicates all system interrupts to an arbitrarily selected "default" CPU of an MPU.

FIG. 2 illustrates a common interrupt protocol using the architecture of FIG. 1. The system interrupt controller communicates all interrupts to an arbitrary "default" CPU. As shown, the CPU 110 of MPU 102 is arbitrarily selected as the default CPU.

The default CPU 110 receives global interrupts from the system interrupt controller 130, as indicated by arrow 202. Receipt of interrupts by the CPU 110 is followed by an acknowledgement (ACK) signal from the CPU 110 to the system interrupt controller 130.

As shown by an arrow 204, the default CPU 110 puts identifiable segments of data into the shared main memory 118, after the default CPU 110 receives a global interrupt signal from the system interrupt controller 130. The data stored in the shared main memory 118 includes instructions which specify the interrupt, the intended destination CPU (in the example of FIG. 2, either CPU 112, 114, or 116), and the interrupt routine to be implemented by the intended destination CPU.

The other CPUs 112-116 in the MP system on respective MPUs 104-108 continuously access the shared main memory 118, as indicated by corresponding arrows 206, 208, and 210, so as to monitor for queues or identifiers of the data segments.

Eventually, the destination CPU (112, 114, or 116) recognizes the interrupt after sampling the shared main memory 118. The data is then retrieved from the shared main memory 118, and the destination CPU acts in accordance with the specified interrupt routine.

However, the foregoing conventional method of global interrupt management is problematic. The default CPU 110 regularly must temporarily stop execution of its own program in order to execute code related to the channelling of interrupts to the shared main memory 118.

Furthermore, excessive traffic exists on the buses between all of the CPUs 110-116 and the shared main memory 118. Referring to FIG. 1, buses 122 and 124 as well as the system bus 120 would be characterized by heavy traffic due to the interrupt protocol.

Because of the numerous transactions that must take place between the CPUs 110-116 and the shared main memory 118, as noted by arrows 204-210 in FIG. 2, the speed of the MP system as a whole is slower than optimum. Further, as a result of the reduced performance, the number of MPUs which may be interfaced to the MP system is more limited.

Figure 3:
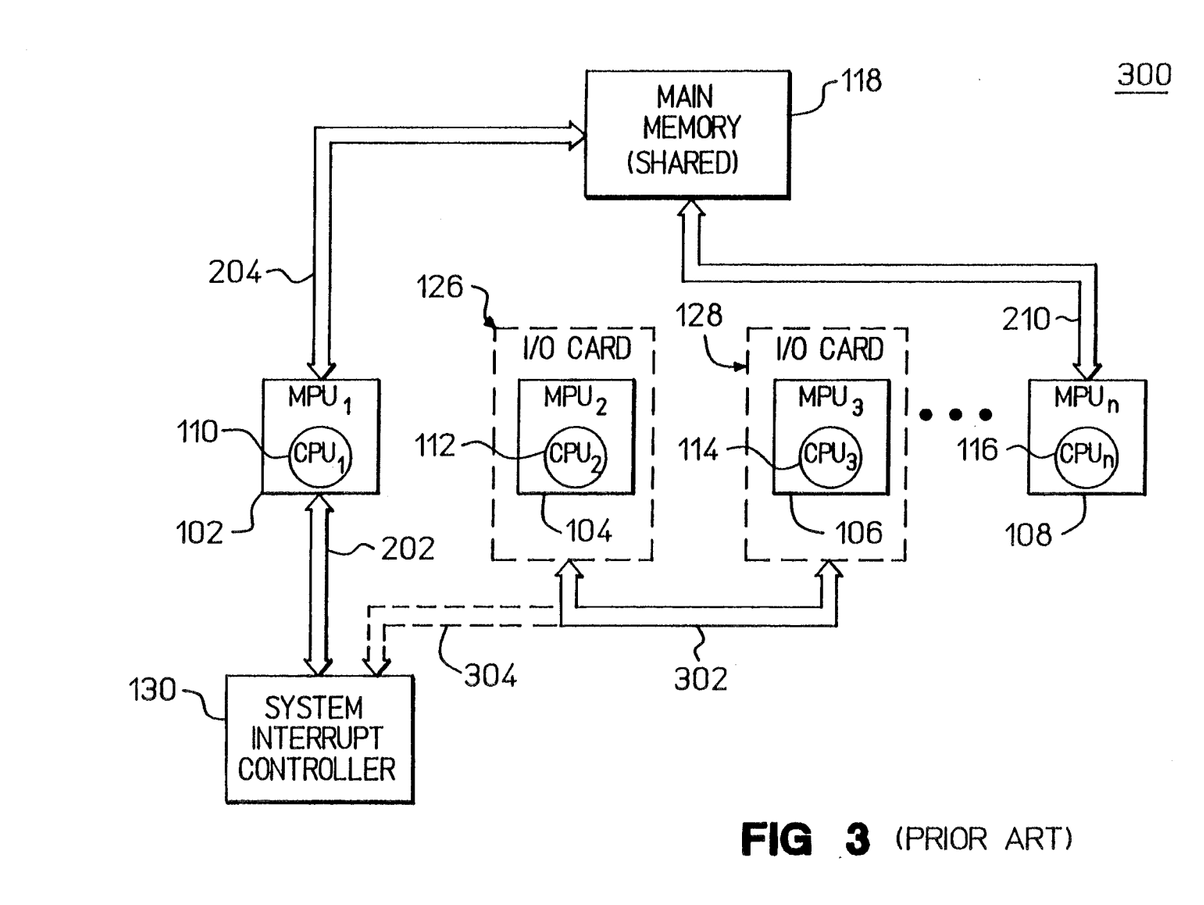
FIG. 3 illustrates the concept of "interrupt snooping" and further shows a management scheme which utilizes interrupt snooping in combination with the default CPU method.

FIG. 3 illustrates the concept of "interrupt snooping" and a management scheme which utilizes interrupt snooping in combination with the default CPU method.

Interrupt snooping has been suggested for MP systems where CPUs are situated on I/O cards having exclusive, architecturally-isolated buses, such as the conventional extended industry standard architecture (EISA) bus or the conventional microchannel (MCA) bus. As shown in FIGS. 1 and 3, the MPUs 104 and 106 reside on separate respective I/O cards 126 and 128, which are plugged into the system bus 120.

Pursuant to interrupt snooping, interrupts are communicated directly between the MPUs 104 and 106, as indicated by an arrow 302, which reside on different I/O cards. From an architecture perspective, the communications indicated by the arrow 302 take place via buses 120, 122, and 124 of FIG. 1. If the only interactions taking place were of this type, then purely interrupt snooping would be occurring.

However, in the MP system of FIG. 1 where one or more other CPUs 102 and 108 are interfaced directly to the system bus 120, the default CPU concept or some other technique must be implemented to direct interrupts to these CPUs. Consequently, the MP system incorporates a hybrid form of interrupt management encompassing both the default CPU concept and the interrupt snooping concept.

Specifically, interrupt snooping would occur between all I/O cards, for example, I/O cards 126 and 128. At the same time, the CPU 110 would be acting as a default CPU. The CPU 110 would channel interrupts to all CPUs on the system bus 120, namely, the CPU 116. Further, the bus masters (not shown) of the I/O cards 126 and 128 would listen for interrupts from the system interrupt controller 130, as indicated by the phantom 304.

It should be noted that more than one CPU could exist on each of the I/O cards. Moreover, any interrupts from the system interrupt controller 130 would be directed to a particular I/O card, not to a particular CPU on an I/O.

However, the foregoing hybrid interrupt management scheme is not desirable in a high performance MP architecture having multiple buses for several reasons. One reason is that there unnecessarily exists redundant interrupt managers in the MP system. In effect, each of the I/O cards 126 and 128 is an interrupt manager as well as the system interrupt controller 130.

Furthermore, much unnecessary traffic still exists on the buses, specifically, the system bus 120. As a result, speed is compromised and the number of processors capable of being interfaced to the MP system is limited.

Figure 4:
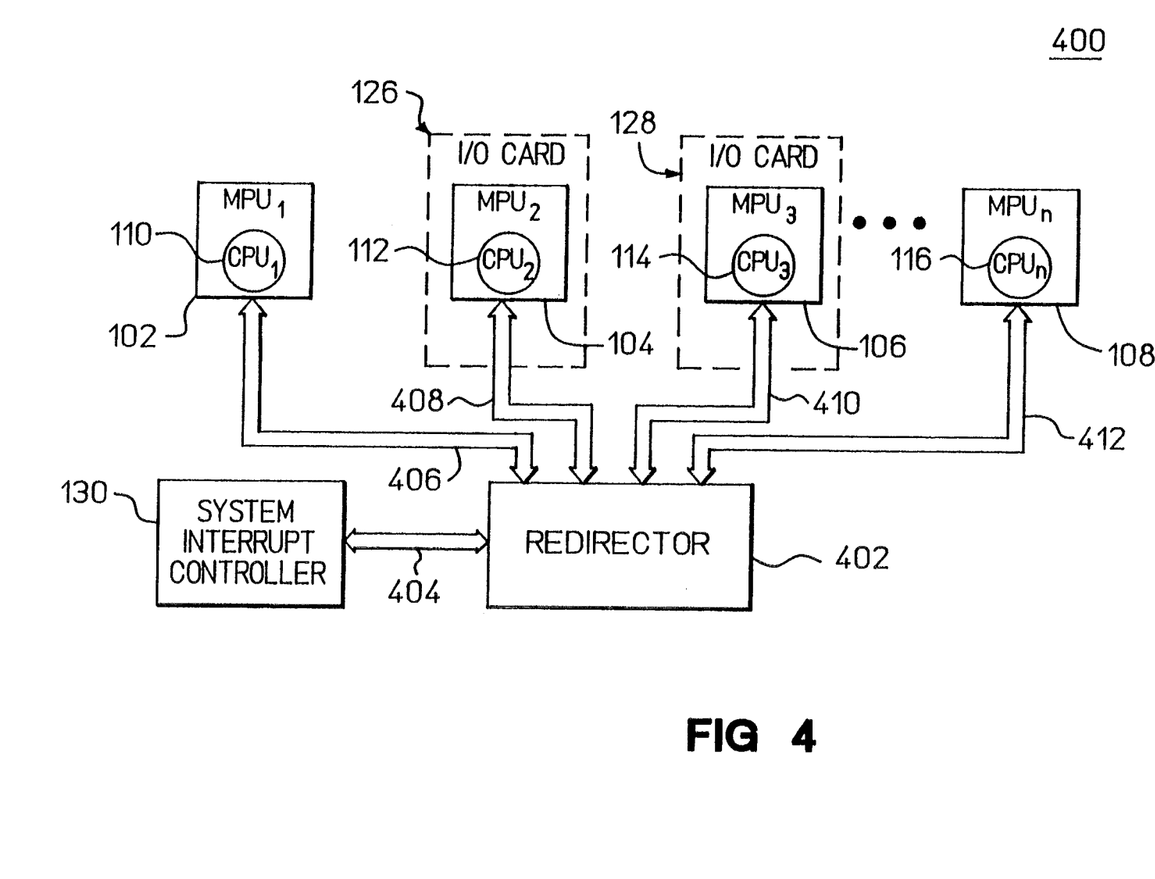
FIG. 4 shows a preferred embodiment of the present invention which implements a redirector, in the form of hardware, software, or a combination thereof, for channelling global system interrupts from the system interrupt controller directly to individual CPUs of the MP system.

FIG. 4 shows the preferred embodiment of the present invention. A redirector 402 is implemented to direct interrupts from the system interrupt controller 130 to individual CPUs on any bus, including individual CPUs on an I/O card, for instance, I/O card 126 or 128.

As shown, the redirector 402 is communicates with the system interrupt controller 130 via a bus 404. Moreover, the redirector 402 communicates with the individual n MPUs 102-108.

The redirector 402 may be optimally implemented in predominantly software, predominantly hardware, or a combination of software and hardware. In the predominantly software implementation, the functionality of the redirector 402 is implemented by program code executed by an arbitrary CPU, sort of a "default CPU", but with a different function, as described below in FIG. 5(a).

In the predominantly hardware implementation, the functionality of the redirector 402 is effectuated by physical logic circuitry. The logic circuitry can be implanted on an external microchip, such as an application specific integrated circuit (ASIC), or any other discrete circuit apparatus(es). Further, the system interrupt controller 130 and the redirector 402 may be incorporated on the same circuit apparatus, such as an ASIC. In the preferred embodiment, programmable logic arrays (PAL) are utilized to implement the hardware logic.

Furthermore, well known in the conventional art, a substantial part of the requisite logic could be implemented in both software and hardware, resulting in a combination implementation.

Figure 5A:
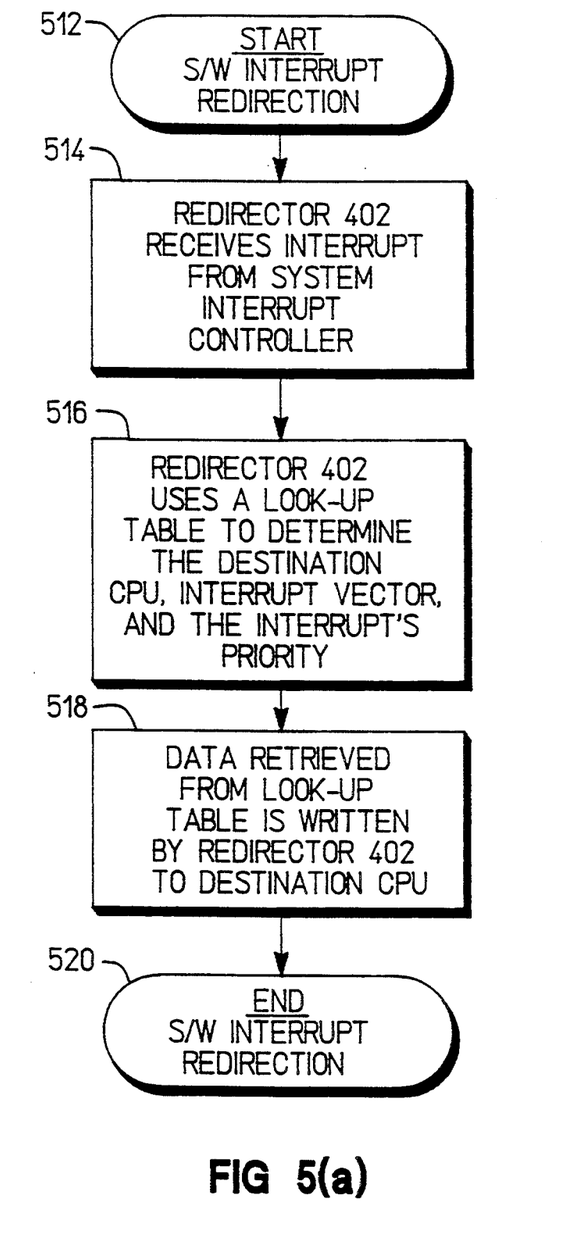
FIG. 5(a) shows the methodology for implementing software (S/W) interrupt redirection.
Figure 5B:
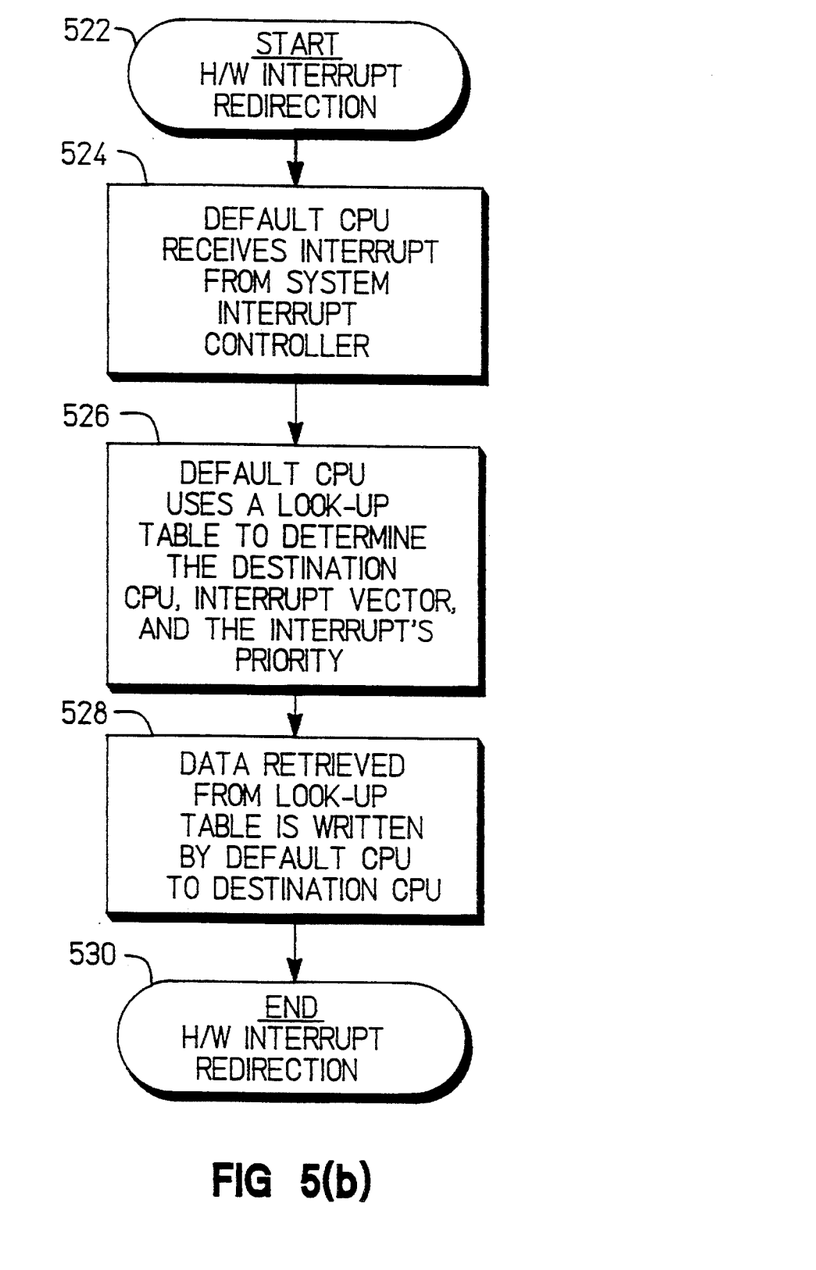
FIG. 5(b) shows the methodology for implementing hardware (H/W) interrupt redirection.

With reference to FIGS. 5a and 5b, the methodology of system interrupt redirection in either software or hardware is described below. FIG. 5(a) pertains to software (S/W) interrupt redirection, whereas FIG. 5(b) pertains to hardware (H/W) interrupt redirection.

(1) At flowchart blocks 514 and 524, either (a) the redirector 402 or (b) the default CPU having the code corresponding to the function of redirector 402 receives the global system interrupt from the system interrupt controller 130.

(2) At flowchart blocks 516 and 526, either (a) the redirector 402 or (b) default CPU, using a look-up table, finds the destination CPU and its associated I/O address, the corresponding interrupt vector, and the interrupt's priority.

(3) At flowchart block 518 and 528, either (a) the redirector 402 or (b) the default CPU then writes the contents of the look-up table to the destination CPU.

Worth noting is that the present invention does not require that the redirector 402 or the default CPU get control of, or "own," the destination CPU, such as in semaphore type systems, before sending an interrupt. Semaphores indicate whether or not the CPU is ready or capable of receiving an interrupt. They insure that a CPU is not overwhelmed at one time with multiple interrupt commands.

The reason that neither the default CPU in the software implementation nor the redirector 402 in the hardware implementation need not own the destination CPU is that only one potential source of global interrupts exists in the MP system. Moreover, the destination CPU handshakes or acknowledges the interrupt from the default CPU or redirector 402.

A further feature of the present invention is that the redirector 402 serves as sort of a buffer/interface between the MPUs 110–116 of the MP system. In other words, the present invention permits homogeneous and nonhomogeneous processors to operate from the same system interrupt controller 130.

Figure 6:
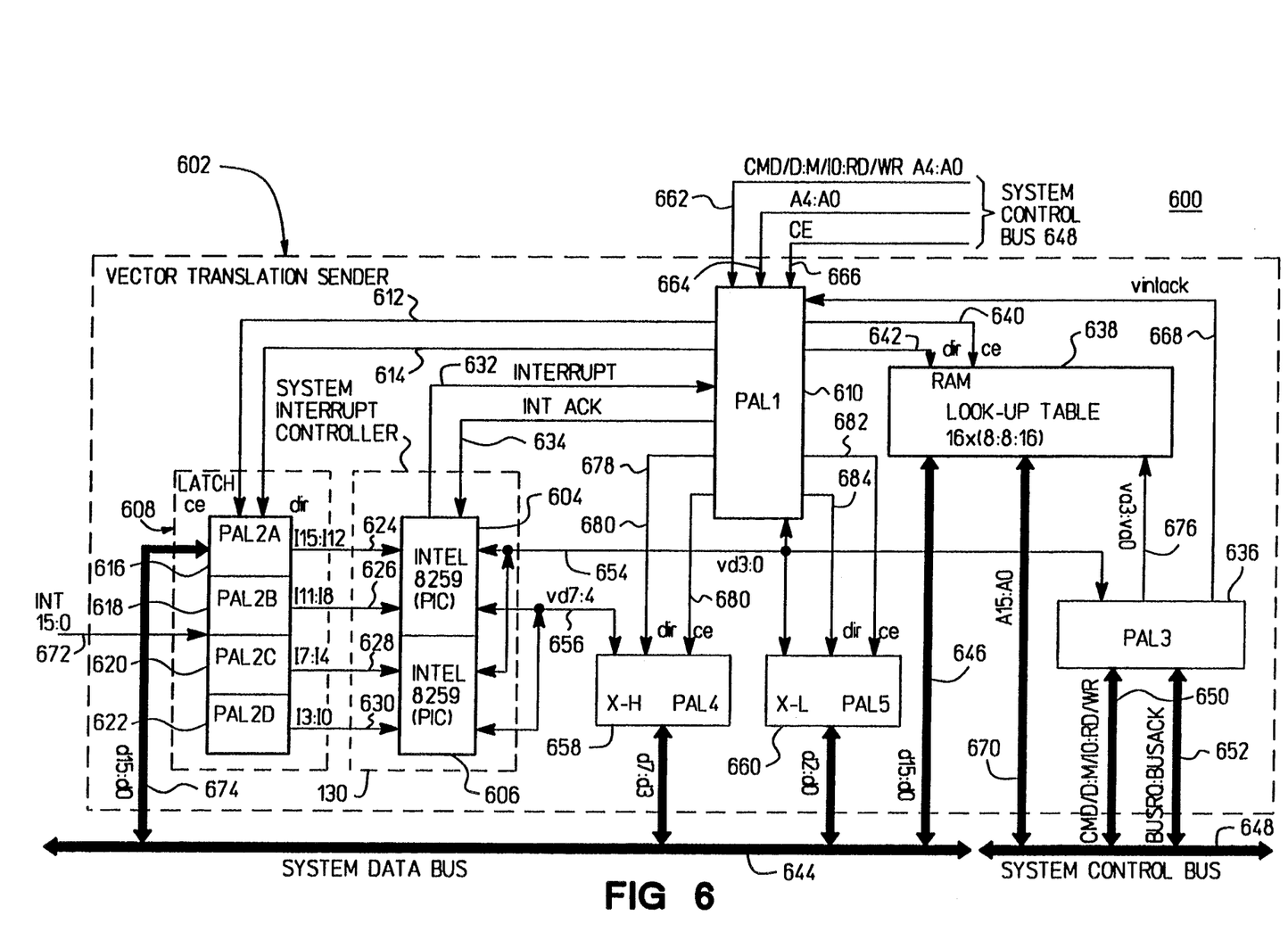
Figure 7:
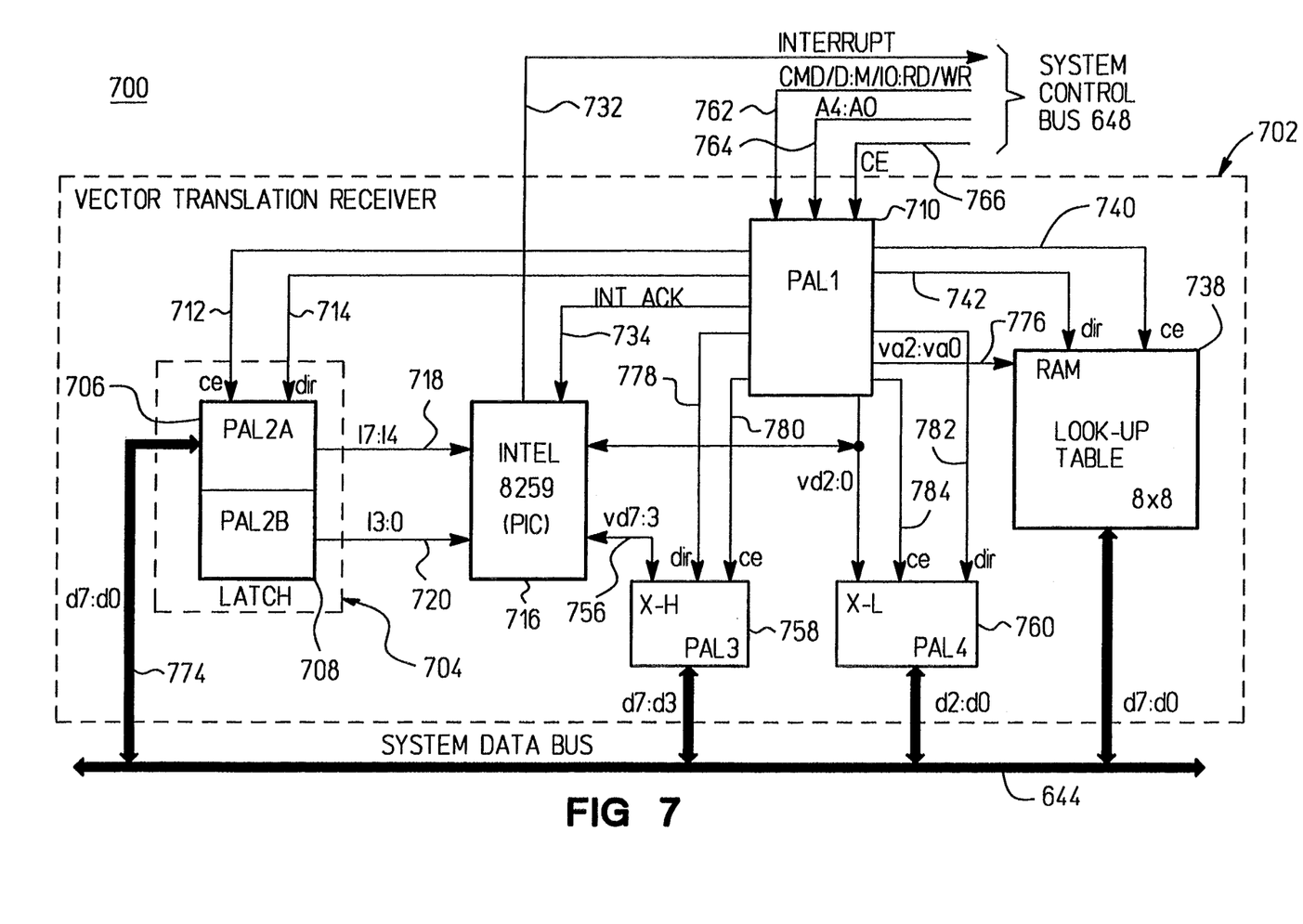

An example of a specific hardware implementation of the present invention is illustrated in FIGS. 6 and 7. The specific hardware implementation is an inexpensive and efficient way to generate up to 256 interrupt vectors in a high performance MP system while decreasing the traffic on the bus network.

The functionality of the redirector 402 is implemented partly at a distinct central location, possibly at or near the system interrupt controller 130, and partly at a location which is local to each of the n MPUs 102–108. FIG. 6 illustrates that part which is associated with the system interrupt controller and which is called a vector translation sender 602, whereas FIG. 7 shows that part which is associated with each individual MPU and which is called a vector translation receiver 702. Essentially, the vector translation sender channels system interrupts to specific CPUs of the n MPUs 102–108, while the vector translation receiver comprises handshaking logic and logic for servicing local interrupts.

As shown by a phantom block 602 in FIG. 6 and by a phantom block 702 in FIG. 7, it is envisioned that both the vector translation sender and the vector translation receiver may be constructed on a single circuit unit, such as an ASIC. It should be noted that the vector translation sender may further include the system interrupt controller 130, as shown in FIG. 6.

The architecture of the vector translation sender of FIG. 6 is IBM PC compatible. More specifically, IBM standard architectures require a set of cascaded "INTEL" 8259 interrupt controllers 604 and 606 serving as the system interrupt controller 130. The cascading of the controllers 604 and 606 is well known in the conventional art. The cascading configuration allows for 16 different interrupts, unlike a single "INTEL" 8259 interrupt controller which only permits 8.

The vector translation sender operates as follows. A 16-bit system interrupt (IRQ 15:0) from somewhere in the MP system enters a latch 608, which is under the control of a PAL1 610. The PAL1 610 controls the latch 608 via a chip enable (CE) control 612 and a direction (DIR) control 614. Moreover, the latch 608 is comprised of a set of parallel PALs 616–622.

The cascaded "INTEL" 8259 interrupt controllers 604 and 606 (system interrupt controller 130) receive the 16-bit system interrupt via a 4-bit bus 624 (I15:I12), a 4-bit bus 626 (I11:I8), a 4-bit bus 628 (I7:I4), and a 4-bit bus 630 (I3:I0). Subsequently, the "INTEL" 8259 interrupt controllers 604 and 606 notify the a PAL1 610 of the system interrupt via an interrupt line 632. The PAL1 610 then forwards an interrupt acknowledge to the cascaded "INTEL" 8259 interrupt controllers 604 and 606 via an interrupt acknowledge (INT ACK) line 634.

Next, the set of cascaded "INTEL" 8259 interrupt controllers 604 and 606 (system interrupt controller 130) forward a 4-bit interrupt vector (vd3:0), which could designate any of 16 different kinds of system interrupts, to the PAL1 610 and a PAL3 636. Accordingly, the PAL1 610 freezes the latch 608 via the chip enable control 612 and further enables a random access memory (RAM) 638 via a chip enable control 640 and a direction control 642.

The PAL3 636 translates the 4-bit interrupt vector into an address (va3:va0) which is sent to a look-up table in the RAM 638. Consequently, a 16-bit data word is transmitted onto the system data bus 644 from the RAM 638, as shown by a bus 646. The system data bus 644 could be a combination of several buses. Further, in the preferred embodiment, the 16-bit data word comprises an interrupt vector (8 bits), a vector priority, and the address (slot number) of the CPU to receive the interrupt vector.

At the same time that the foregoing 16-bit data word is outputted by the RAM 638, PAL3 636 generates an I/O cycle on the system control bus 648 via controls 650 and 652 in order to write the 16-bit data word to the destination CPU. The system control bus 648 comprises both addressing and control lines of the MP system and also may be a combination of buses. As shown, the PAL3 636 has the ability to implement the following commands on the system control bus 648: (1) a control signal indicating either command or data (CMD/D), (2) a control signal indicating either memory or I/O (M/IO), (3) a control signal indicating either read or write (RD/WR), (4) a bus request (BUSRQ) signal, and (5) a bus acknowledge (BUSACK) signal.

Furthermore, the interrupt vectors outputted by the RAM 638 must be isolated from the data lines (vd7:0) 654 and 656 of the cascaded "INTEL" 8259 interrupt controllers 604 and 606, while still allowing for access to the data lines (vd7:0) 654 and 656. Access to the data lines (vd7:0) 654 and 656 is necessary so that the cascaded "INTEL" 8259 interrupt controllers 604 and 606 may be programmed.

In order to read or write (program) to the cascaded "INTEL" 8259 interrupt controllers 604 and 606, various signals are monitored by the PAL1 610 from the system control bus 648. As shown, the PAL1 610 receives the following signals from the system control bus 648: (1) a control signal indicating either command or data (CMD/D), (2) a control signal indicating either memory or I/O (M/IO), (3) a control signal indicating either read or write (RD/WR), and (4) an address (A4:A0, or A4 through A0). The foregoing signals are generated by an external I/O device and can be used to either read or write (program) to either the "INTEL" 8259 interrupt controllers 604 and 606 or the RAM 638.

When an external I/O device attempts to access the cascaded "INTEL" 8259 interrupt controllers 604 and 608, a PAL4 658 and a PAL5 660 are enabled to permit access to the "INTEL" 8259 interrupt controllers 604 and 606 from the system data bus 644. In contrast, when a system interrupt is being sent to one of the n MPUs 102–108, the PAL4 658 and PAL5 660 are disabled to isolate the data lines (vd7:0) 654 and 656 from the system data bus 644 and, thus, from the 16-bit data word ultimately outputted by the RAM 638.

FIG. 7 shows a vector translation receiver 702 which is situated in the locality of the destination CPU designated by the interrupt vector outputted from RAM 638. The vector translation receiver has similar components and functioning in relation to the vector translation sender, as will be described below.

The vector translation receiver of FIG. 7 reads the interrupt vector, from the system data bus 644 and ultimately from the vector translation sender of FIG. 6, into a latch 704. The latch 704 is comprised of two parallel PALs: a PAL2A 706 and a PAL2B 708. Moreover, the latch 704 is controlled by a PAL1 710 via a chip enable (CE) control 712 and a direction (DIR) control 714. Similar to PAL1 610 of FIG. 6, the PAL1 710 of FIG. 7 serves as the controlling logic.

An single "INTEL" 8259 interrupt controller 716 receives the 7-bit interrupt vector (I7:I0) through parallel buses 718 (I7:I4) and 720 (I3:0) as shown. The "INTEL" 8259 interrupt controller 716 prioritizes the 7-bit interrupt vector (along with any local interrupts) and translates the vector into a 3-bit interrupt vector (vd2:0).

Next, the "INTEL" 8259 interrupt controller 716 notifies its associated local MPU (one of the n MPUs 102–108) of the system interrupt via interrupt line 732. In turn, the local MPU knows that it must perform an interrupt acknowledge cycle with the signalling "INTEL" 8259 interrupt controller 716. Essentially, the interrupt ackwnoweldge cycle is a special kind of I/O read.

As shown, the PAL1 710 receives the following signals from the local MPU: (1) either command or data (CMD/D), (2) either memory or I/O (M/IO), (3) either read or write (RD/WR), and (4) an address (A4:A0). The PAL1 710 decodes the foregoing signals from the local MPU and forwards an interrupt acknowledge to the "INTEL" 8259 interrupt controller 716 through interrupt acknowledge 734.

The "INTEL" 8259 interrupt controller 716 forwards a 3-bit interrupt vector (vd2:0), which could designate any of 8 different kinds of interrupts, to the PAL1 710. Accordingly, the PAL1 710 freezes the latch 704 via the cache enable control 712 and enables a RAM 738 via a cache enable control 740. Moreover, the PAL1 710 translates the 3-bit interrupt vector into an address (va2:va0) which is sent to a look-up table in the RAM 738. Consequently, the original interrupt vector (I7:I0) retrieved from the system data bus 644, which could be any of 8 different possibilities, is used to identify another vector, which can be any of 256 different possibilities.

Finally, the interrupt vector is sent from the RAM 738 to the associated local MPU via the system data bus (d7:0) 644.

The interrupt vectors outputted by the RAM 738 must be isolated from the data lines (vd7:0) of the "INTEL" 8259 interrupt controller 716, while still allowing for access to the data lines (vd7:0). One reason is that access to the data lines (vd7:0) is necessary so that the "INTEL" 8259 interrupt controller 716 may be accessed and programmed.

When attempting to read or write to the "INTEL" 8259 interrupt controller, a PAL3 758 and a PAL4 760 are enabled to permit access to the "INTEL" 8259 interrupt controller 716 from the system data bus 644. In contrast, when interrupts are being sent to the associated local MPU, the PAL3 758 and PAL4 760 are disabled to isolate the data lines (vd7:0) from the "INTEL" 8259 interrupt controller 716 from the system data bus 644 and, thus, from the interrupt vectors (d7:0) outputted by the RAM 738.

The system and method of the present invention may also be implemented with interrupt snooping, as discussed above. The implementation would be a hybrid between interrupt snooping and either software interrupt redirection or hardware interrupt redirection. Such an approach might be desirable in an MP system having I/O cards with critical response needs.

The software interrupt redirection is preferred in PCs having only 1, 2, or 3 processors and associated subsystems. One reason is that the present invention can be implemented at low cost. Another reason is that it does not burden the MP system with additional hardware. Still another reason is that the software overhead is not great. Finally, the system and method can more easily be designed to interface across multiple architecturally-isolated buses.

The hardware interrupt redirection is a more desirable form of the present invention in MP systems with a large number of global interrupts. In other words, the additional software overhead at the default CPU in such an MP system for servicing interrupts may grind the default CPU down to a halt.

Finally, software interrupt redirection, interrupt redirection, or interrupt snooping with either software or hardware interrupt redirection is compatible with the 0S/2 or UNIX operating systems (drivers). The reason is that the global interrupts are transparent to the operating systems and application programs.

It should be understood that present invention is not limited to the preferred embodiment, and that the implementations presented above are merely examples for the purpose of illustration. The scope of the present invention should therefore be interpreted by the following claims as defined by the foregoing figures and text.

We claim the following:

1. A system for increasing the performance of a multiprocessor computer system, comprising:
   a shared memory;
   two or more processors coupled to said shared memory by a system bus, each of said two or more processors configured to transmit global interrupts to another two or more processors via said system bus;
   a system interrupt controller, coupled to said system bus, configured to receive and retransmit all of said global interrupts transmitted by said two or more processors; and
   a redirector, coupled to said system bus, configured to communicate with said system interrupt controller and said two or more processors, said redirector configured to receive all of said global interrupts retransmitted by said system interrupt controller, said redirector further configured to transmit interrupt data associated with said retransmitted global interrupts directly to a destination processor of said two or more processors.

2. The system of claim 1, wherein said redirector and said system interrupt controller comprise:
one or more program interrupt controllers; and
software operated upon by a default processor of said two or more processors of the multiprocessor computer system.

3. The system of claim 1, wherein one or more of said two or more processors is a microprocessor.

4. The system of claim 1, wherein said multiprocessor computer system is implemented in a personal computer.

5. The system of claim 1, wherein said system interrupt controller and said redirector are incorporated on an ASIC.

6. The system of claim 1, wherein said redirector comprises a vector translation sender corresponding to said system interrupt controller and a vector translation receiver corresponding to each of said two or more processors.

7. The system of claim 1, wherein said two or more processors are nonhomogeneous.

8. The system of claim 1, wherein one or more of said two or more processors is coupled to said system bus via buses which are architecturally isolated from each other.

9. A method for increasing the performance of a multiprocessor computer system, the multiprocessor system having two or more processors, a system interrupt controller, and a redirector, the two or more processors, system interrupt controller, and redirector coupled to and communicating with each other via a system bus, the method comprising the steps of:
(1) receiving, in the system interrupt controller, a global interrupt from one of the two or more processors;
(2) determining, at the system interrupt controller, the priority of said global interrupt and an associated global interrupt vector;
(3) transmitting said global interrupt vector from the system interrupt controller to the redirector;
(4) determining, at the redirector, a system bus address of a destination processor of the two or more processors for receiving said global interrupt;
(5) translating said global interrupt into a destination processor dependent vector; and
(6) notifying said destination processor of said global interrupt by transmitting said destination processor dependent vector.

10. The method of claim 9, wherein said step (4) comprises the step of:
(a) searching a look-up table in a memory unit to determine said system bus address of said destination processor.

11. A system for increasing the performance of a multiprocessor computer system, comprising:
a shared memory;
two or more processors coupled to said shared memory by a system bus, each of said two or more processors configured to transmit global interrupts via said system bus;
interrupt controller means, coupled to said system bus, for controlling said global interrupts transmitted by said two or more processors, said interrupt controller means receiving and retransmitting all of said global interrupts;
receiving means for receiving all of said retransmitted global interrupts from said interrupt controller means;
address determination means, coupled to said receiving means, for determining an intended destination processor of said two or more processors to receive said global interrupts; and
transmit means, coupled to said address determination means, for transmitting interrupt data associated with said global interrupts directly to said destination processor.

12. The system of claim 11, wherein one or more of said two or more processors is coupled to said system bus via a bus which is architecturally isolated from other buses in the multiprocessor computer system.

13. The system of claim 11, wherein said determination means comprises a look-up table in a random access memory, said lookup table containing:
an address of said destination processor;
an interrupt vector associated with said global interrupt; and
a priority level of said global interrupt.

14. A system for increasing the performance of a multiprocessor computer system, comprising:
a shared memory;
two or more processors coupled to said shared memory by a system bus, each of said two or more processors configured to transmit global interrupts to another two or more processors via said system bus;
a system interrupt controller, coupled to said system bus, configured to receive and retransmit all of said global interrupts transmitted by said two or more processors, said system interrupt controller including,
one or more first programmable interrupt controllers coupled to said system bus,
a first discrete logic, coupled to said one or more first programmable interrupt controllers, implemented by a first plurality of programmable logic arrays, configured to control said system interrupt controller, and
a first memory unit, coupled to said discrete logic, configured to store said interrupt data; and
a redirector, coupled to said system bus, configured to communicate with said system interrupt controller and said two or more processors, said redirector configured to receive all of said global interrupts retransmitted by said system interrupt controller, said redirector further configured to transmit interrupt data associated with said retransmitted global interrupts directly to a destination processor of said two or more processors, said redirector including,
one or more second programmable interrupt controllers coupled to said system bus,
a second discrete logic, coupled to said one or more second programmable interrupt controllers, implemented by a second plurality of programmable logic arrays, configured to control said redirector, and
a second memory unit, coupled to said second discrete logic, configured to store said interrupt data.

* * * * *